(12) United States Patent
Chu et al.

(10) Patent No.: US 7,894,372 B2
(45) Date of Patent: Feb. 22, 2011

(54) TOPOLOGY-CENTRIC RESOURCE MANAGEMENT FOR LARGE SCALE SERVICE CLUSTERS

(75) Inventors: Lingkun Chu, Kendall Park, NJ (US); Tao Yang, Santa Barbara, CA (US); Jingyu Zhou, Goleta, GA (US)

(73) Assignee: IAC Search & Media, Inc., Oakland, CA (US)

( * ) Notice: Subject to any disclaimer, the term of this patent is extended or adjusted under 35 U.S.C. 154(b) by 966 days.

(21) Appl. No.: 11/142,694

(22) Filed: May 31, 2005

(65) Prior Publication Data

US 2006/0268742 A1 Nov. 30, 2006

(51) Int. Cl.
*H04L 12/28* (2006.01)
*H04J 3/26* (2006.01)
*H04J 3/24* (2006.01)

(52) U.S. Cl. .................. 370/255; 370/432; 370/473
(58) Field of Classification Search .................. 370/254
See application file for complete search history.

(56) References Cited

U.S. PATENT DOCUMENTS

| | | | | |
|---|---|---|---|---|
| 6,304,556 | B1 * | 10/2001 | Haas | 370/254 |
| 6,744,740 | B2 * | 6/2004 | Chen | 370/255 |
| 6,788,650 | B2 * | 9/2004 | Chen et al. | 370/254 |
| 6,810,259 | B1 * | 10/2004 | Zhang | 455/456.5 |
| 6,829,222 | B2 * | 12/2004 | Amis et al. | 370/238 |
| 2003/0151513 | A1 * | 8/2003 | Herrmann et al. | 340/573.1 |
| 2003/0152041 | A1 * | 8/2003 | Herrmann et al. | 370/310 |
| 2004/0088412 | A1 * | 5/2004 | John et al. | 709/226 |

OTHER PUBLICATIONS

Banerjee, S. et al., "Scalable Secure Group Communication Over IP Multicast", IEEE J. on Selected Areas in Commuincations, vol. 20, No. 8, Oct. 2002, p. 1511-1527.*
Reddy, A. et al., "Fault Isolation in Multicast Trees", ACM, 2000, p. 29-40.*
Kai Shen, et al., "Clustering Support and Replication Management for Scalable Network Services", IEEE Transactions on Parallel and Distributed Systems, vol. 14, No. 14, Nov. 2003., 12pp.
K. McCloghrie, et al., "IPv4 Multicast Routing MIB", Network Working Group, Request for Comments: 2932, Category: Standards Track, Microsoft, Oct. 2000, http://www.ietf.org/rfc/rfc2932.txt?number=2932, 26pp.
J. Case, et al., "A Simple Network Management Protocol (SNMP)", Network Working Group, Request for Comments: 1157, Obsoletes: RFC 1098, MIT Laboratory for Computer Science, May 1990, http://www.ietf.org/rfc/rfc1157.txt?number=1157, 34pp.
PCT International Search Report and Written Opinion, International Application No. PCT/US06/15139; International Filing Date, Apr. 20, 2006; mailing date, Oct. 22, 2007 (9 pp.).

* cited by examiner

*Primary Examiner*—Daniel J Ryman
*Assistant Examiner*—Cassandra Decker
(74) *Attorney, Agent, or Firm*—Stephen M. De Klerk; SNR Denton US LLP

(57) ABSTRACT

Topology-centric resource management for large scale service clusters is described herein. According to certain embodiments of the invention, techniques include 1) creating optimized topology with network switches to connect service modules based on application flows and bandwidth requirements, 2) providing centralized or decentralized monitoring schemes to maintain the topology view of a service cluster, and 3) using the topology information for optimizing load balancing and service information dissemination. Other methods and apparatuses are also described.

16 Claims, 15 Drawing Sheets

500

```
┌─────────────────────────────────────┐
│ Create a service graph for a service │
│ cluster in a hierarchical structure  │
│ via one or more network switches     │
│ with load balance capability         │
│                 501                  │
└─────────────────────────────────────┘
                  │
                  ▼
┌─────────────────────────────────────┐
│ In response to an external query     │
│ received by a frontend server of the │
│ service cluster, the frontend server │
│ contacts a cache server of the       │
│ service cluster according to the     │
│ service graph to determine whether   │
│ the requested content is stored in   │
│ the cache server                     │
│                 502                  │
└─────────────────────────────────────┘
                  │
                  ▼
┌─────────────────────────────────────┐
│ If so, the queried content is        │
│ retrieved from the cache server      │
│ according to the service graph and   │
│ returned to a client of the external │
│ query                                │
│                 503                  │
└─────────────────────────────────────┘
                  │
                  ▼
┌─────────────────────────────────────┐
│ If not, the frontend server contacts │
│ an index server according to the     │
│ service graph to retrieve a list of  │
│ relevant links (e.g., URLs)          │
│ associated with the external query   │
│                 504                  │
└─────────────────────────────────────┘
                  │
                  ▼
┌─────────────────────────────────────┐
│ In response to the relevant links,   │
│ the frontend server fetches content  │
│ for each of the links from a         │
│ document server according to the     │
│ service graph within the cluster and │
│ returns the content to the client    │
│                 505                  │
└─────────────────────────────────────┘
```

FIG. 5

IP Header Structure

TOPOLOGY-CENTRIC RESOURCE MANAGEMENT FOR LARGE SCALE SERVICE CLUSTERS

FIELD OF THE INVENTION

The present invention relates generally to service cluster management within a high speed network. More particularly, this invention relates to a topology-centric resource management for large scale service clusters.

BACKGROUND

Busy web sites often use hundreds or thousands of machines to form a large-scale cluster to respond quickly to highly concurrent user requests. Such a cluster is typically configured with multiple network switches in a hierarchical structure. FIG. 1 is a block diagram illustrating an example of a conventional network topology in a service cluster. In communications networks, a topology is usually a schematic description of the arrangement of a network, including its nodes and connecting lines, also defined as a physical topology and/or a logical topology. Referring to FIG. 1, the cluster 100 typically includes computer nodes 102-105 connected to access switches 106-109, which are connected to switches in the next levels. These switches 106-109 in turn are connected to another switch.

The hierarchical topology is needed partially because of the physical limitations of switches. Typically, each switch includes a limited number of ports (e.g., uplink and downlink ports) and can only connect a limited number of machines with 1000 Mb or 100 Mb ports. The physical location of switches also requires a hierarchical topology. For example, a hosting center leases cages of space to a company, similar to cage 101 of FIG. 1. Each cage (e.g., cage 101) can only host a limited number of machines (e.g., nodes 102-105) and the entire cluster (e.g., cluster 100) needs to connect multiple non-adjacent cages. The bandwidth among links in the network also varies. For example, the bandwidth across switches is limited by the uplink of each switch. The bandwidth across switches in different cages may be lower than that inside a cage.

SUMMARY OF THE DESCRIPTION

Topology-centric resource management for large scale service clusters is described herein. According to certain embodiments of the invention, techniques include 1) creating optimized topology with network switches to connect service modules based on application flows and bandwidth requirements, 2) providing centralized or decentralized monitoring schemes to maintain the topology view of a service cluster, and 3) using the topology information for optimizing load balancing and service information dissemination.

According to one aspect of the invention, an example of a process includes, but is not limited to dividing nodes of a service cluster into multiple groups each having multiple members following network topology, where each group includes a dedicated node to communicate with other groups of the service cluster. In response to a message received from a member of a respective group, the dedicated node of the respective group distributes the message to other groups of the service cluster and a remainder of the members.

According to another aspect of the invention, an example of a process includes, but is not limited to maintaining a service graph for a service cluster having a plurality of nodes and each having one or more replicas, where the service graph has a hierarchical infrastructure based on a network topology information associated with the plurality of nodes of the service cluster. In response to a service invocation from a first node, a second node is selected via the service graph within the service cluster according to a predetermined algorithm based on a load of the second node and a routing distance between the first and the second nodes.

According to another aspect of the invention, an example of a process includes, but is not limited to, creating a service graph having a hierarchical structure based on application service logics of a service cluster having a plurality of nodes, and deriving a switch layout based on the service graph for optimized availability and networking performance of the plurality of nodes. The switch layout is created by determining a separation factor for the service cluster, separating the nodes of the service cluster into a plurality of sub-service graphs based on the determined separation factor, assigning a switch for each node of each sub-service graph, and coupling the plurality of sub-service graphs to form the service graph using one or more load balancing switches.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 5 and 6 are flow diagram illustrating examples of processes performed by a service cluster according to one embodiment of the invention.

DETAILED DESCRIPTION

Figure 1:
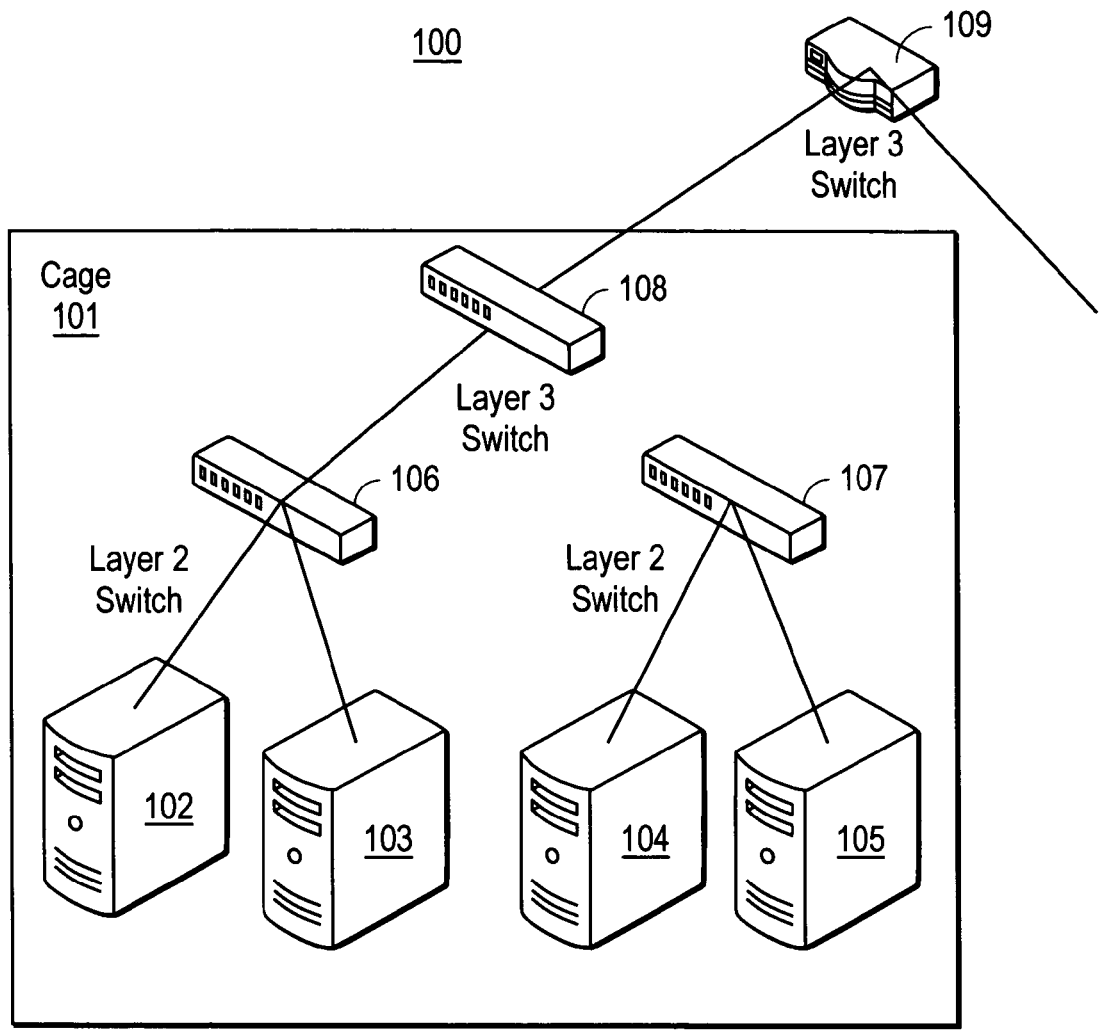
FIG. 1 is a block diagram illustrating a conventional network topology of a service cluster.

Topology-centric resource management for large scale service clusters is described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, new techniques for topology-centric management in optimizing the use of computer and network resources are provided to improve the availability and performance of cluster-based services. According to one embodiment, relatively high performance is achieved, where traffic within a switch is localized and accessing time from one machine to another is usually faster within a switch compared to a cross-switch transaction. According to another embodiment, fault tolerance is improved, where switches can fail occasionally or need to stop their services for maintenance. Network services hosted in such a cluster need to consider service replication across different switches so that unavailability of a switch does not stop machines connected by other switches in providing services to external users.

According to certain aspects of topology-centric resource management, an optimized network topology is generated based on application service computations. According to one embodiment, certain processes are performed to monitor the creation and change of network topology in providing a dynamic abstract graph for the software system on the fly. The topology information may be utilized in: 1) dynamic service invocation; 2) maintaining a global and local yellow page for individual service availability and attributes of individual services within a large cluster.

Topology-Based Generation for Service Clusters

Given an application with hundreds or thousands of service modules, according to one embodiment, these modules are assigned to computers and a network topology is derived such that system availability and performance are optimized. In a particular embodiment, a service graph G (V, E) (also referred to as a service super graph) is utilized to model interaction among application modules within a cluster in providing a response to an external request. In one embodiment, in a service module graph each node in V represents a service module. There is one entrance module which receives an incoming request (e.g., an external request) and activates a processing procedure. This procedure may invoke other service modules in the system for further processing.

Each module may have one or more replicated units. Any replica of a module can receive an external request (e.g., in the case of entrance module), or an internal request from another module. Typically, according to one embodiment, interior modules have replications while some of leaf modules may or may not have replications. A directed edge in E between two modules represents a service invocation relationship. A->B means that module A calls module B to perform a function. An edge between two modules can be annotated with a communication weight representing an approximated or estimated bandwidth requirement per second.

Figure 2:
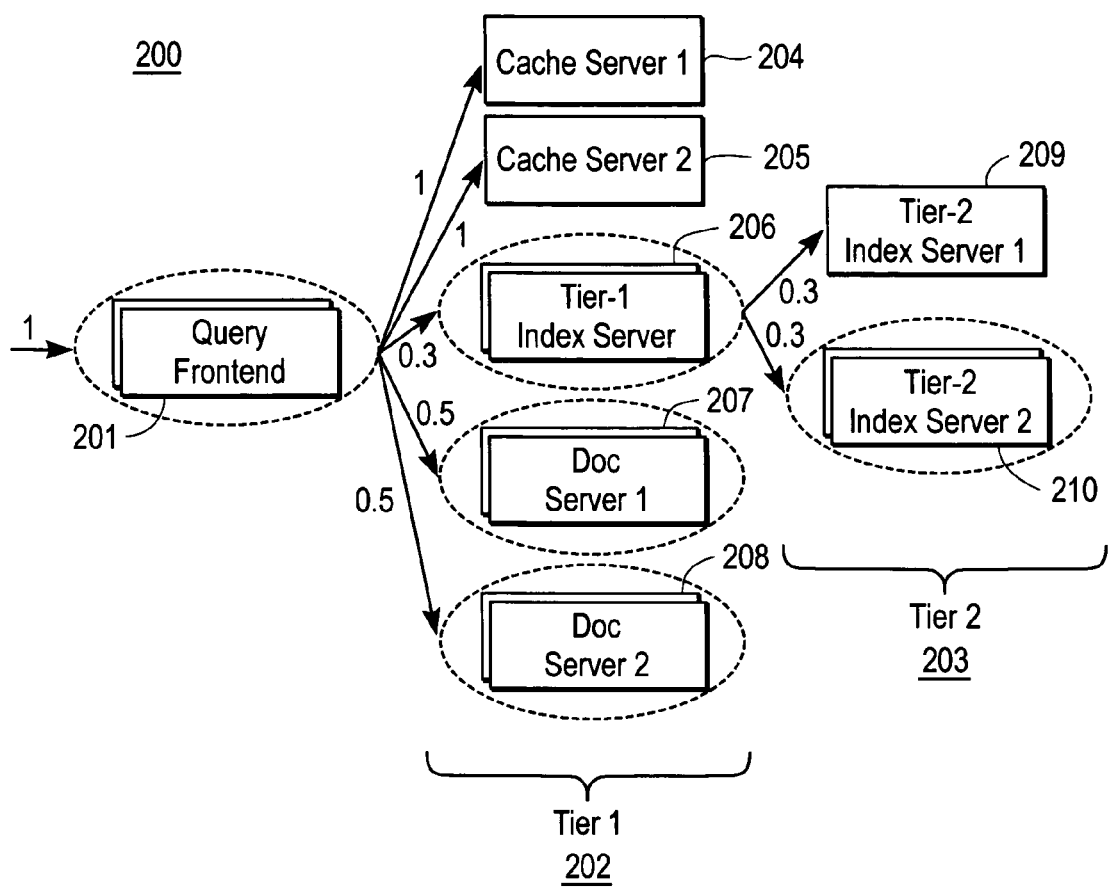
FIG. 2 is a block diagram illustrating a network topology configuration of a service cluster according to one embodiment of the invention.

FIG. 2 is a block diagram illustrating an example of a service graph for a tiered data search service, according to one embodiment. Units inside a dotted eclipse represent replicas. An external query first reaches one of the query front-ends. The query front-end then contacts two partitioned cache servers to check if the query has been processed before. If so, the result is retrieved from the cache servers and is immediately returned to the user. Otherwise, one of the tier-1 index servers is contacted, which then contacts two tier-2 index partitions. The second partition is replicated on two nodes. After the index server returns a list of relevant URLs, the query front-end fetches a short description for each URL from two partitioned document servers. The label on the directed edge between two modules presents the traffic volume between these two modules.

Given a service graph G (V, E) and assuming each node (e.g., modules or units of modules) is assigned to one computer, according to one embodiment, a method is provided to assign switches to link these computers. The optimization improves the availability and access performance, as well as to minimize the number of switches used.

In one embodiment, a separation factor X that is no more than a maximum replication degree of all the modules is utilized. The separation factor may be used to decide a fault resilience factor in terms of switch failures. In general, a bigger separation factor leads to better availability. Replication degree represents a number of replicas for one module. Fault resilience factor represents how much a system can tolerate faults without interruption of the service.

According to one embodiment, a separation factor X (X>=1) is selected and a service graph is derived into X separated graphs. Each replica of a module may be circularly assigned to X separated graph groups, {G1, G2, . . . , Gx}. Note that after the assignment, according to certain embodiments, G1 may have all the modules, while other graphs may only have portion of the modules. The communication weight may also be updated in the separated graphs.

According to one embodiment, each separate graph is assigned to one or more switches. Initially, an entrance node (e.g., a node which has an external link) is selected and the replicas of this node are assigned to one switch (e.g., the same switch). For edge X->Y, the replicas of Y are assigned to the same switch as X. If there are not enough ports (e.g., downlink ports) in the switch, another switch is allocated for Y. In addition, the bandwidth demand from one switch to another is monitored based on a weight given in the separated graph. The bandwidth stress of a link is defined as a ratio of a required bandwidth over a link bandwidth (e.g., required_bandwidth/link_bandwidth). A required bandwidth is the communication bandwidth required between modules. A link bandwidth is the maximum communication bandwidth can be provided by the uplink or downlink. Further, the bandwidth stress inside one switch may also be monitored if needed. The bandwidth stress of a switch is defined as a ratio of a required bandwidth over an aggregated switch bandwidth (e.g., required_bandwidth/switch_aggregated_bandwidth). The bandwidth information may be maintain by an administrator or a network designer. The above processes may be repeated until all modules are assigned for one or more switches.

In one embodiment, a local optimization is performed to remove a node from one switch and assign the removed node to another switch, if such a local adjustment localizes and improves communication performance. In a particular embodiment, the local adjustment is performed if (1) any bandwidth stress <1; and (2) total bandwidth stress and the stress deviation is minimized.

In a further embodiment, the switch communication volume based on the assigned service modules may be derived to guide the selection of switches and port requirements. After all separated graphs have been assigned switches, the switch layouts are connected together using additional load balancing switches or existent switches in the G1's layout according to a service logic. After the above operations a connected switch hierarchy is created which improves the availability and the performance of the service cluster(s).

Figure 3A:
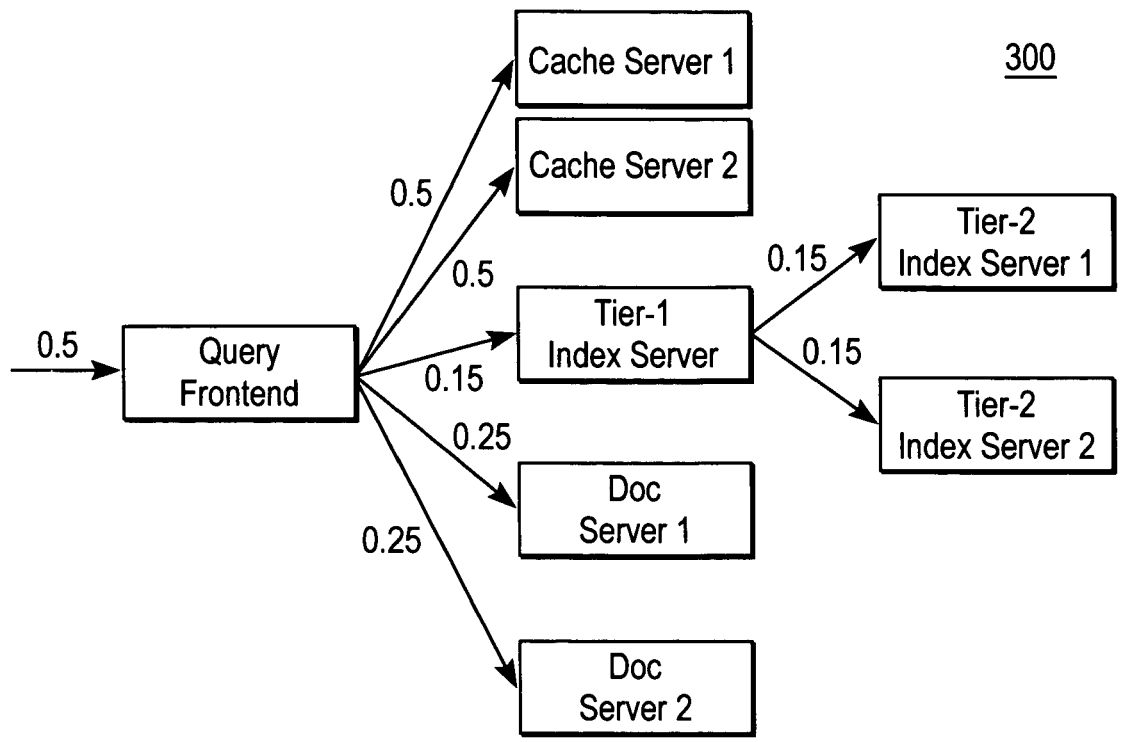
FIGS. 3A and 3B are block diagrams illustrating a network topology configuration of a service cluster according to another embodiment of the invention.

We use the service graph in FIG. 2 as an example. We assume the separation factor to be 2 and the following shows the two separation graphs as shown as service graphs 300 and 350 respectively shown in FIGS. 3A and 3B. We have also updated the labels in these graphs. Finally, switches are assigned for each graph in a breadth first style.

Figure 4A:
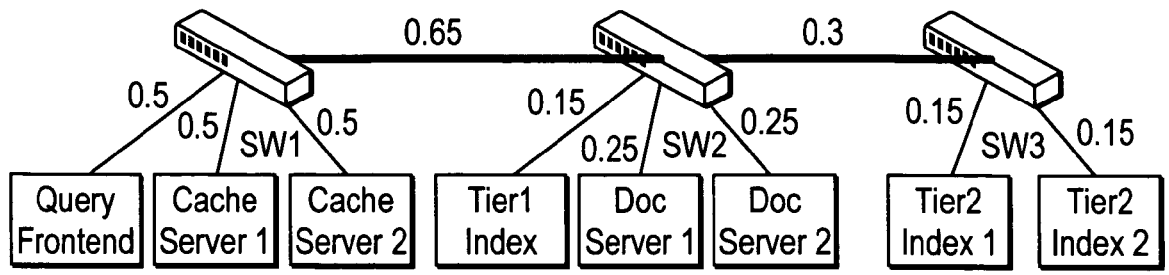
FIGS. 4A-4C are block diagrams illustrating a network topology configuration of a service cluster according to another embodiment of the invention.

Referring to FIG. 2, according to one embodiment as an example for the purposes of illustration, it is assumed that each switch has four ports and the link capacities across all the switches are 1 (e.g., 100 percents of the link bandwidth, such as 100 Mb or 1 Gb). Take G1 as an example shown in FIG. 3A. After the first iteration, the following layout is formed as shown in FIG. 4A:

SW1: Frontend 201, Cache1 204, Cache2 205, SW2
SW2: Tier1 Index 206, Doc1 207, Doc2 208, SW3
SW3: Tier2 Index1 209, Tier2 Index2 210
    Stress (SW1->SW2)=0.65
    Stress (SW2->SW3)=0.30

Figure 4B:
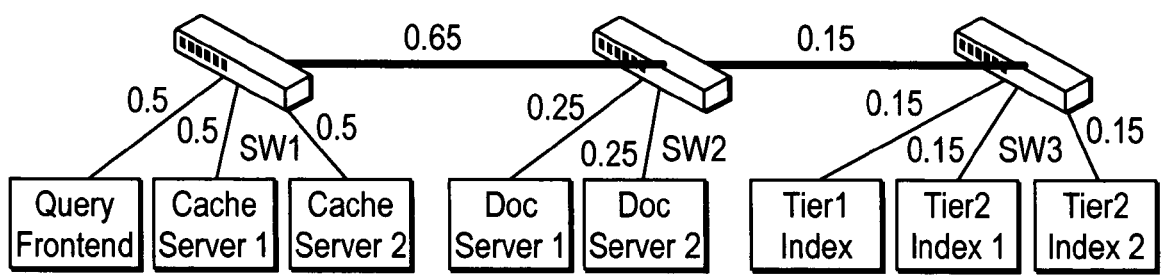

In the adjustment operation, if Tier1 Index 206 is moved to SW3 as shown in FIG. 4B, the stress may be reduced as follows:

Stress (SW1->SW2)=0.65
Stress (SW2->SW3)=0.15

Figure 3B:
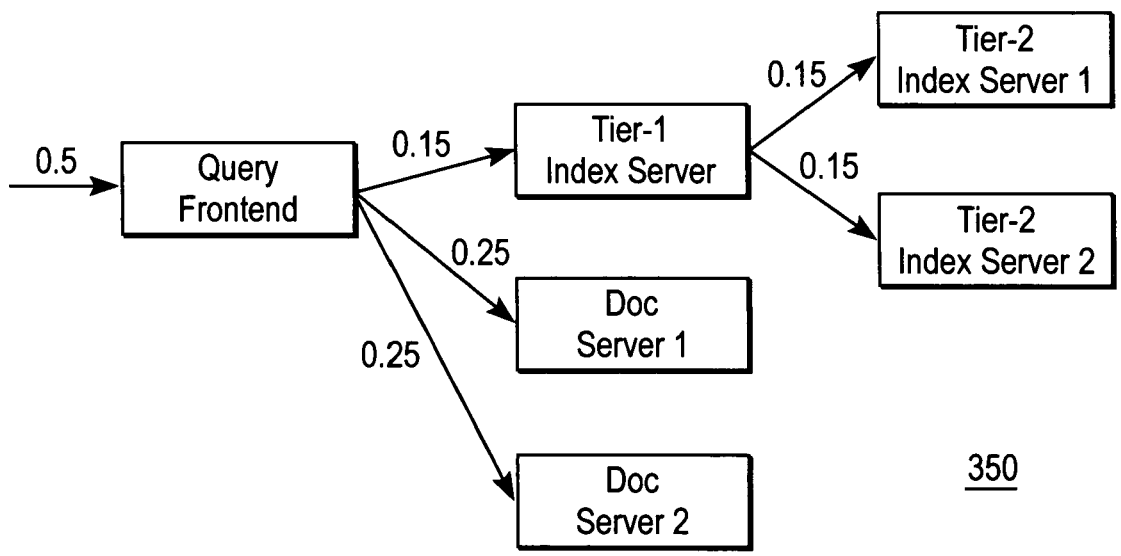
Figure 4C:
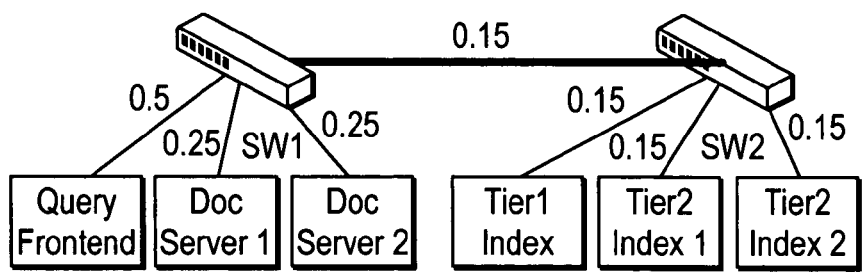

Similarly, the layout for G2 as shown in FIG. 3B may also be performed using the techniques similar to the one set forth above as shown in FIG. 4C. Finally, two layouts may be coupled together. Here, SW1 (G1) and SW1 (G2) are coupled to a load-balancing switch. Note that the switch stress in FIG. 2 and other figures throughout this application is shown for illustration purposes only. Different switch stress may be formed dependent upon a specific configuration.

FIG. 5 is a flow diagram illustrating an example of a process for processing an external query according to one embodiment. The process 500 may be performed by processing logic that may comprise hardware (e.g., circuitry, dedicated logic, etc.), software (such as is run on a general-purpose computer system, a server, a router, or a dedicated machine), or a combination of both.

Referring to FIG. 5, at block 501, a service graph (e.g., a super graph) is created for a service cluster in a hierarchical structure via one or more network switches with load balancing capability. In one embodiment, the service graph is created using some or all of the techniques set forth above. At block 502, in response to an external query received by a frontend server of the service cluster, the frontend server contacts a cache server of the service cluster according to the service graph to determine whether a queried content is stored in the cache server. If so, at block 503, the queried content is retrieved from the cache server according to the service graph and returned to a client of the external query.

Otherwise, at block 504, the frontend server of the service cluster contacts an index server according to the service graph to retrieve a list of relevant links (e.g., URLs) associated with the external query. At block 505, in response to the list of relevant links, the frontend server fetches content for each of the links from a document server according to the service graph and return the fetched content to the client. In one embodiment, the content includes a brief description for each of the links. Other operations may also be performed.

Figure 6:
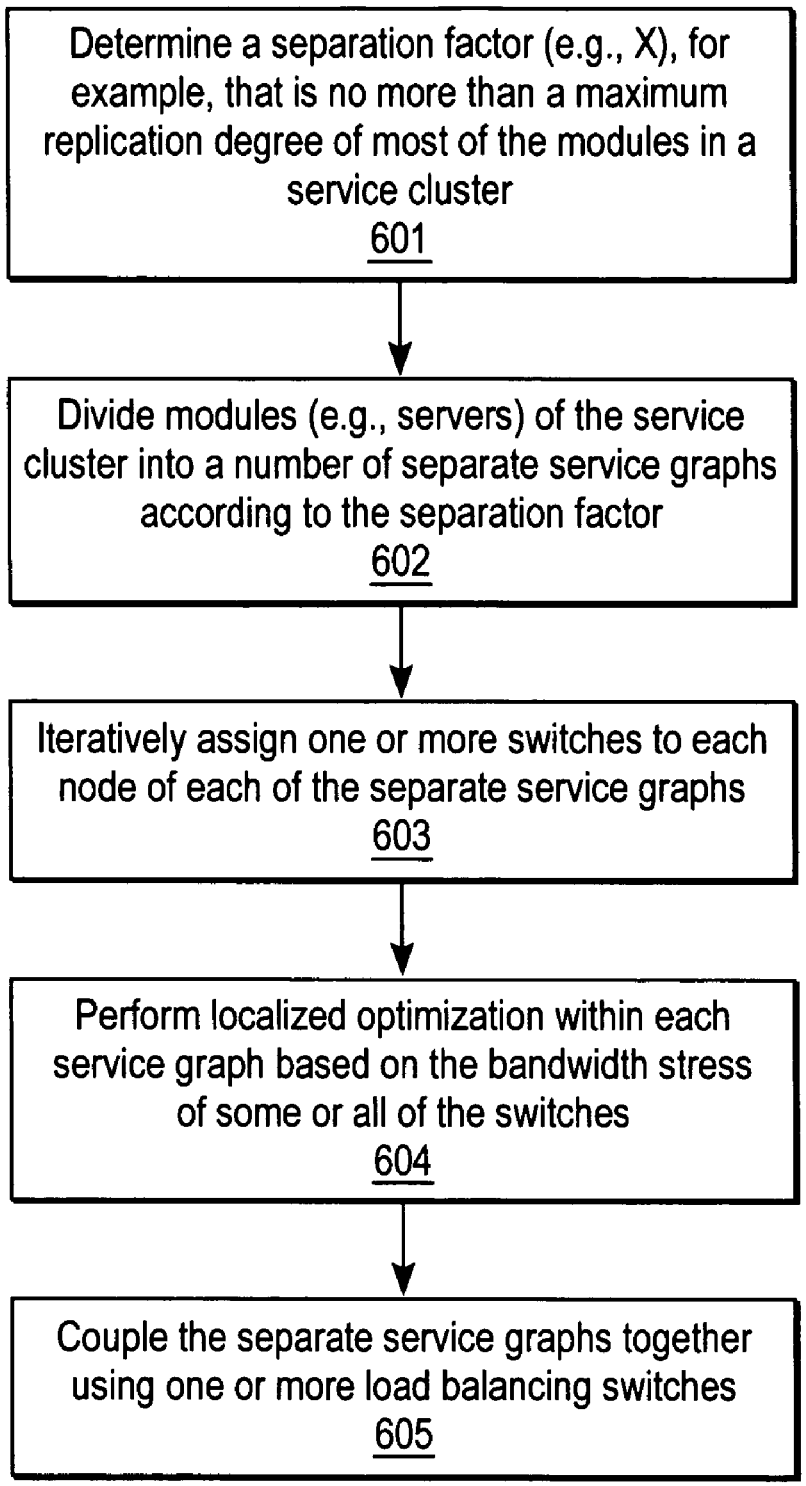

FIG. 6 is a flow diagram illustrating an example of a process for creating a service graph according to one embodiment. The process 600 may be performed by processing logic that may comprise hardware (e.g., circuitry, dedicated logic, etc.), software (such as is run on a general-purpose computer system, a server, a router, or a dedicated machine), or a combination of both. For example, process 600 may be performed as a part of operations involved in block 501 of FIG. 5.

Referring to FIG. 6, at block 601, a separation factor (e.g., X) is determined for a service graph. In one embodiment, the separation factor is less than a maximum replication degree of some or all of the modules of a service cluster. At block 602, the modules of the service cluster are divided into multiple separate service graph based on the separation factor. At block 603, one or more switches are iteratively assigned to each node of each of the separate service graphs. In one embodiment, replicas of a node may be assigned to the same switch. At block 604, a localized optimization is performed within each of the separate service graphs based on the bandwidth stress of some or all of the switches involved. At block 605, the separate service graphs are coupled to each other to form a final service graph (e.g., a super service graph) using one or more additional load balancing switches. Other operations may also be performed.

Monitoring of Network Topology

According to certain embodiments, the above operations provide a guiding procedure in deriving a network topology for an application service cluster. The specific topology may be adjusted based on the application needs and operational needs. In one embodiment, the creation and change of such a topology may be monitored so that a topology graph can be extracted for the use of resource management described in details further below.

Figure 8A:
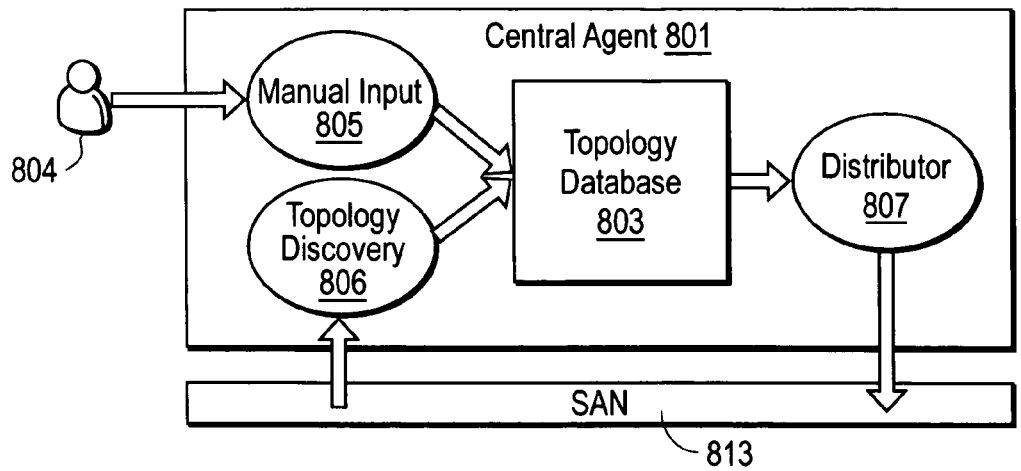
FIGS. 8A and 8B are block diagrams illustrating a network topology configuration of a service cluster according to another embodiment of the invention.
Figure 8B:
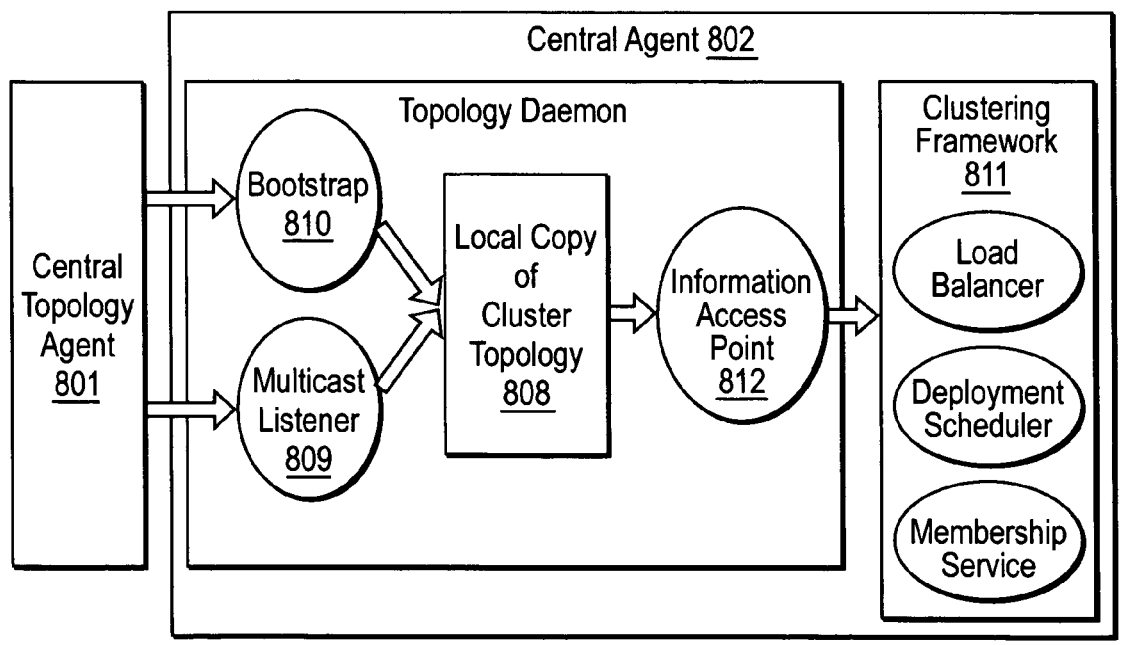
Figure 10A:
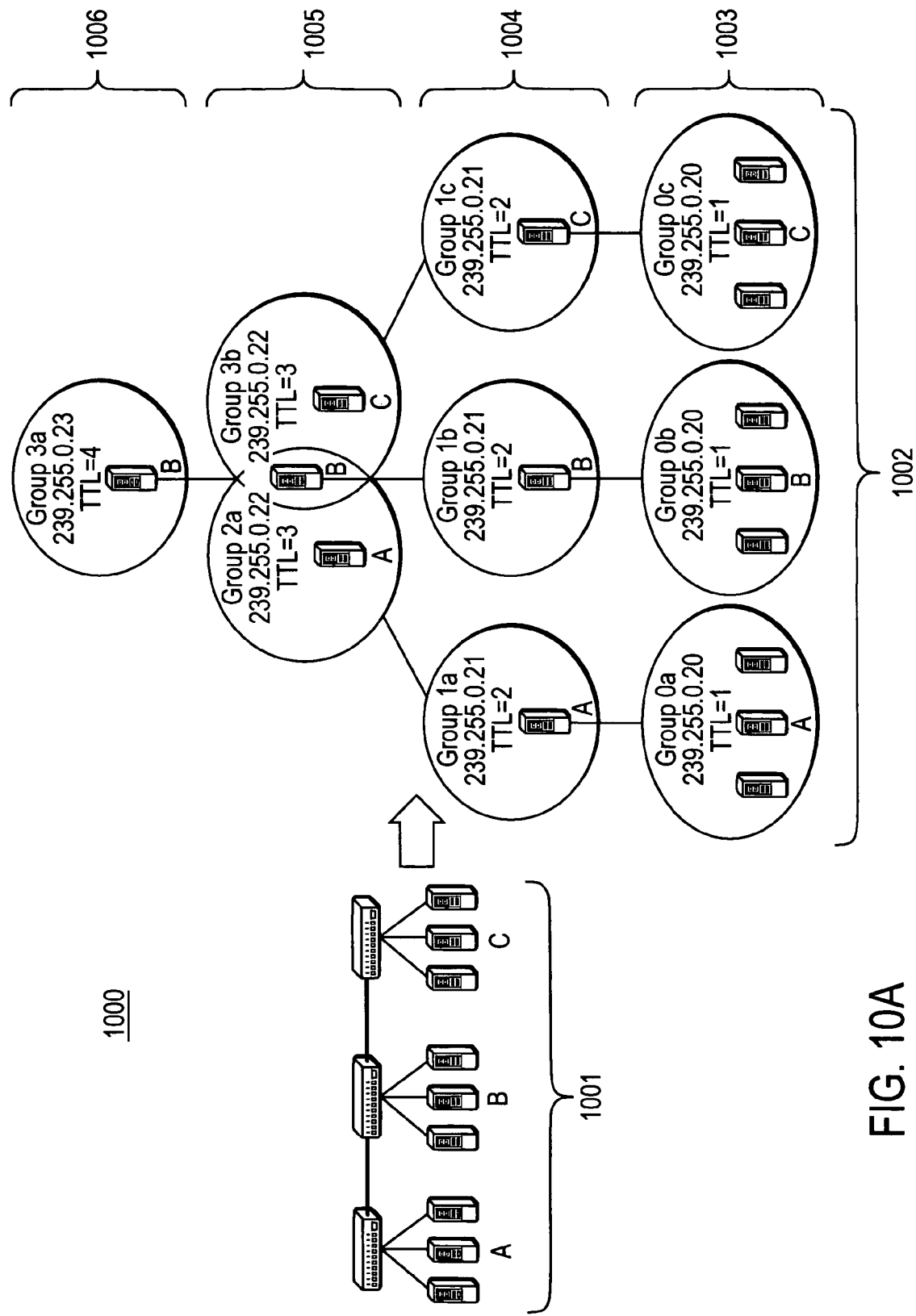
FIGS. 10A and 10B are block diagrams illustrating a network topology configuration of a service cluster according to certain embodiments of the invention.
Figure 10B:
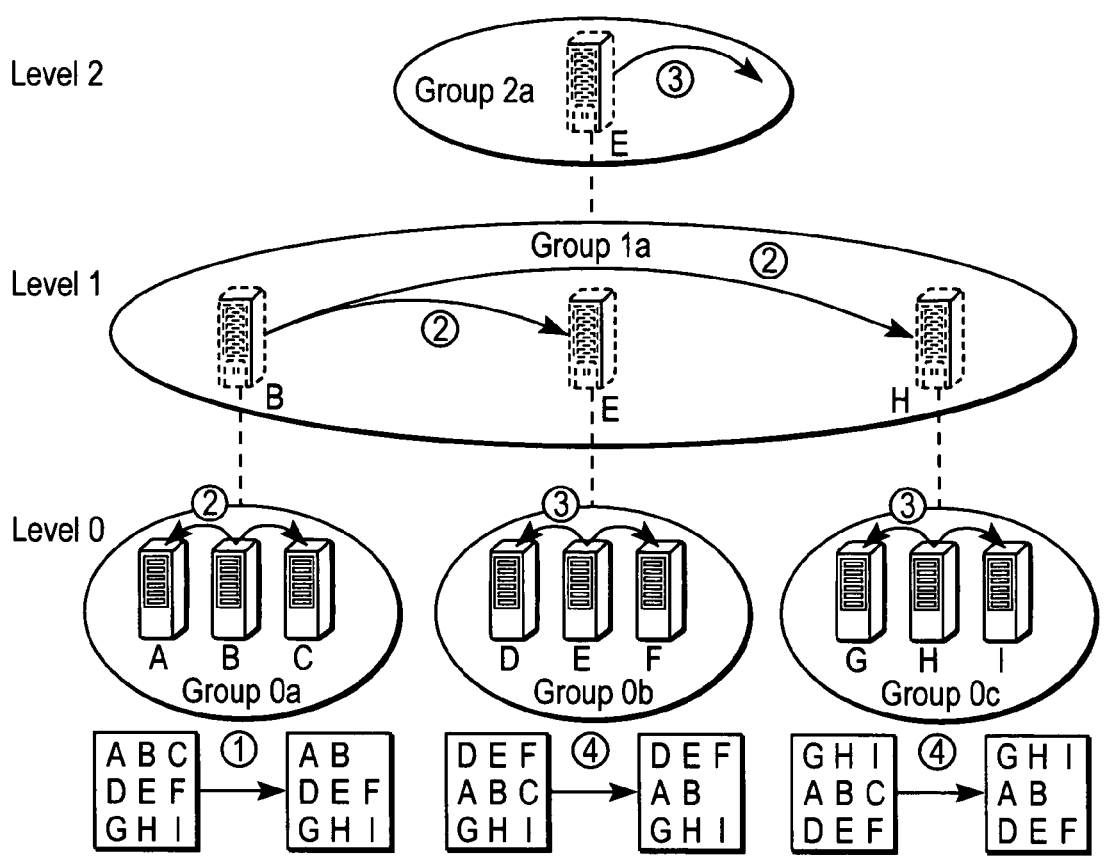

Two approaches are described herein. The first one is a centralized approach where the topology information is dedicatedly collected and distributed to the interested parties as shown in FIGS. 8A and 8B. The second one is a distributed approach where the topology discovery capability is integrated into the application protocols as shown in FIGS. 10A-10B.

Figure 7:
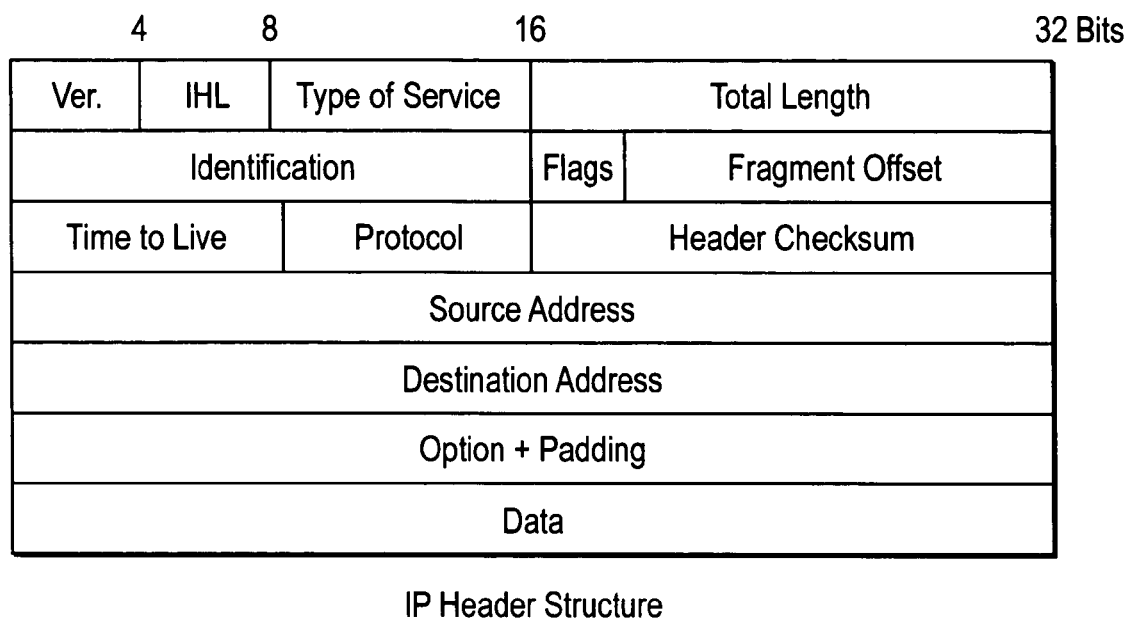
FIG. 7 is a block diagram illustrating an IP header of an IP packet.

According to one embodiment, one or more standard fields of a packet may be used to indicate a network topology associated with the packet. Specifically, a TTL (time to live) value in an IP packet as shown in FIG. 7 is utilized. However, other field or fields of the IP packet or other types of packets may also be utilized. An advantage of the centralized approach is that a more thorough view of network topology may be provided because the centralized node can have a relative more complicated logic and tolerate more the overhead. However, this approach can be complicated and may not detect and propagate a change quickly. On the other hand, the distributed approach is built within the application protocol. Thus it is lighter weighted and there is less need to propagate a change because most of the nodes maintain their own network topology information independently.

Centralized Approach Examples

The information of network topologies is generally available from network administrators. Additionally, it can be automatically discovered with the help of 1) routing path; 2) SNMP (simple network management protocol); and 3) other network switch interfaces.

FIG. 8A is a block diagram illustrating an example of a centralized approach according to one embodiment. Referring to FIG. 8A, a central agent 801 is deployed to maintain the topology information from the administrator(s) 804 via interface 805. The topology information may be stored in a database 803 locally or remotely. The central agent 801 also periodically queries network switches through the SNMP protocol or other switch interface 806. The topology information may be distributed to other entities via interface 807.

According to one embodiment, a push mechanism, a poll mechanism, or a combination of both may be used to disseminate the topology information. FIG. 8B is block diagram illustrating an example of a process of the topology information on a computer node, according to one embodiment. Referring to FIG. 8B, when a new node 802 is joining the cluster, according to one embodiment, the node 802 may poll a central topology server (e.g., central topology agent 801) over a network (e.g., SAN or storage area network 813) to receive a copy of the cluster topology, which may be stored in a local storage 808.

After that, the node 802 may listen to a predetermined channel (e.g., a multicast channel) to receive any update from the server via interface. Since the topology changes do not happen frequently, bandwidth requirement for this multicast channel can be relatively small. Additionally, according to a further embodiment, each node stores a copy of the topology information on its local storage 808 accessible by other modules 811 via interface 812 and uses this local copy to speed up a boot process 810. In a particular embodiment, the node 802 may compare the version of its local copy with the current version obtained from the multicast channel and poll the delta changes (e.g., the differences) from central server if necessary. Other configurations may exist.

Figure 9:
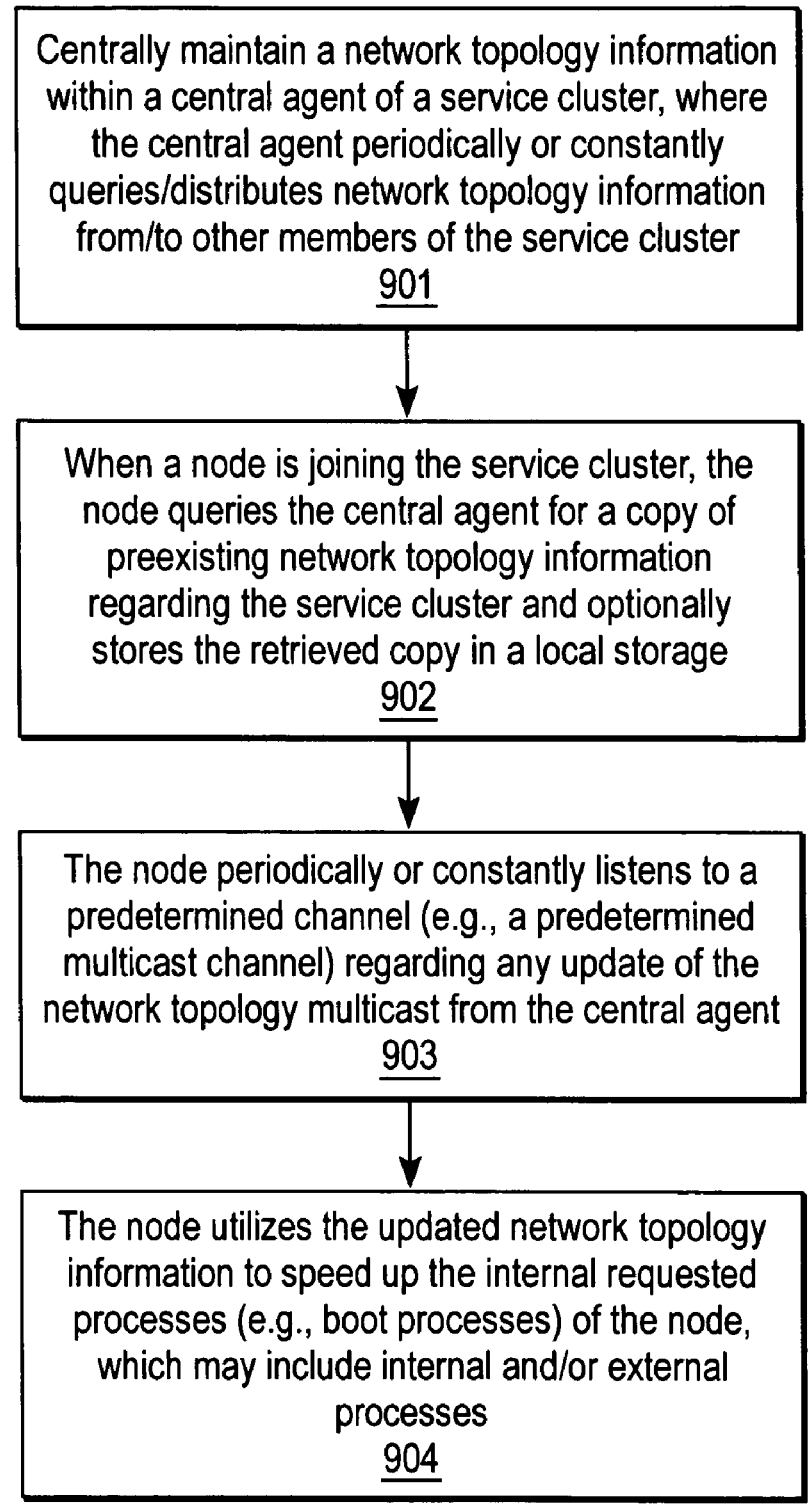
FIG. 9 is a flow diagram illustrating an example of a process performed by a service cluster according to one embodiment of the invention.

FIG. 9 is a flow diagram illustrating an example of a process for a centralized approach according to one embodiment. The process 900 may be performed by processing logic that may comprise hardware (e.g., circuitry, dedicated logic, etc.), software (such as is run on a general-purpose computer system, a server, a router, or a dedicated machine), or a combination of both. For example, process 900 may be performed by central agent 801, node 802, or a combination of both of FIGS. 8A and 8B.

Referring to FIG. 9, at block 901, centralized network topology information is maintained within a node of a service cluster, such as, for example, a central agent. In one embodiment, the central agent periodically or constantly queries and/or distributes the network topology information from and/or to other members of the service cluster. At block 902, when a node is joining as a member of the service cluster, the node queries the central agent who maintains the centralized network topology information for a copy of the centralized network topology information. In one embodiment, the node may store the copy of the network topology information in its local storage. At block 903, the node that has joined or is joining the service cluster may periodically or constantly listen to a predetermined communications channel, such as a predetermined multicast channel for any updates regarding the network topology information, which may be updated by any members of the service cluster and distributed by the central agent. Thereafter, at block 904, the node may utilize the downloaded network topology information to speed up the requested processes of the respective node. The requested processes may include internal processes and/or external processes (e.g., external service invocation), according to certain embodiments of the invention. Other operations may also be performed.

Distributed Approach Examples

According to another embodiment, the topology discovery capability is incorporated into a distributed algorithm such as the failure detection and membership protocol. According to one embodiment, a predetermined field of a network packet may be used to limit the outreach of a multicast packet so that the membership traffic is localized. In a particular embodiment, a TTL value of an IP packet is utilized for such a purpose. Note that throughout this application, a TTL value of an IP packet may be used as an example for illustration purposes only. However, it will be appreciated that other fields or other types of network packets may also be utilized.

For machines in a large-scale cluster, according to one embodiment, a hierarchical tree is created among nodes. In general, an internal tree node, configured as a leader, passes the information (e.g., availability information) from its parent to the child nodes. In addition, the leader collects the information from its children and propagates to its parent. The information from one child of a node will be propagated to another child of this node.

In one embodiment, an internal tree node and its children forms a communications group. Multicast may be used within the group for communications. A hierarchical tree is created based on the network topology of level-3 switches by exploiting the Time-To-Live (TTL) field in an IP packet header. The original purpose of TTL is to prevent packets falling into infinite routing loops, which can occur due to misconfiguration, instability during routing repair, etc. The TTL field puts an upper limit on these lopping packets. The TTL field indicates the maximum number of hops a packet may traverse. When an IP packet passes a router, the router decreases the TTL of this packet by one and forwards this packet to the appropriate subnet or subnets. When the count reaches zero, the packet may be discarded.

According to one embodiment, a number of small groups may be formed among cluster nodes using the topology information. The overlapping of these groups forms a hierarchical structure among nodes. The multicast within each group is relatively efficient and the scalability of the protocol is achieved by dividing nodes into small groups. In this scheme, each node joins a group (e.g., a multicast group) with the same TTL value and each group has a communication channel (e.g., following the UDP protocol). As level 3 switches separate node multicast communication with different TTL value, a topology-aware hierarchy can be formed, which is also adaptive to any topology change subsequently.

Initially when a node joins a group, its TTL value is set to one and it uses the base channel of the joining protocol (e.g., a membership protocol). By listening to a predetermined multicast channel, according to one embodiment, the node can find if a leader exists for the group being joined. If there is a leader, the node will use a bootstrap protocol to quickly build its local yellow-page directory. Otherwise, an election process is performed which will be described in details further below. If this newly joined node is a leader in this multicast group, it increases its TTL value and joins the membership channel at a higher level. This process continues until the maximum TTL count is reached, which is the largest possible hop count according to its network topology of the cluster. The maximum TTL value may be determined by an administrator or a network designer. For example, an administrator can determine the maximum TTL value through the current or future network layout. In one embodiment, a value of 64 can cover most of Internet.

The bootstrap protocol allows a newly joined node to quickly build its local yellow-page directory. After knowing the leader, the newly joined node contacts the leader to retrieve the membership information that the leader knows. Meanwhile, the leader of this communications group also queries this newly joined node for its information (e.g., availability information) in case that the newly joined node is a leader for another group in a lower level. When the new information is obtained, the group leader of this new node propagates the information further to all group members using an update propagation protocol.

In one embodiment, a group election determines a leader for a group using a predetermined algorithm, such as, for example, a bully algorithm. Each node is assigned a unique ID (e.g., IP address). According to a particular embodiment, a node with the lowest ID becomes the group leader. If there is already a group leader, a node will not participate the leader election. To reduce the chance of election due to failure of a leader, according to one embodiment, each group maintains a group leader and a backup leader. The backup leader is randomly chosen by the group leader and the backup leader will take over the leadership if the primary leader fails. This allows a quick recovery if only the primary leader fails. When both the primary and the backup leader fail, the election algorithm is performed to select a new leader, which will designate a backup leader thereafter by the newly elected group leader.

Noted that if a group only has one member (e.g., a first joined node), then this node is the default leader. There could be a number of multicast groups with one member, especially when the joining process reaches a relatively high TTL value. Such groups may be maintained for topology adaptability because some new nodes may join in the future. Since the maximum TTL value is normally small in a large cluster, there should not be many such groups. The communications cost is negligible for groups with only one member, because the corresponding router multicast tree is very small.

The above group formation process creates a hierarchical tree where leaves are cluster nodes and internal tree nodes are leaders elected. The level of a group is defined based on the TTL value of the group, such as the TTL value of the group minus one. In one embodiment, most of the alive nodes in the cluster may be eventually included in the hierarchical tree if there is no network partition. With network partitions, forests may be formed and every node may be in one of the trees. That means that the status change of a node will be propagated to all nodes connected in the same tree.

According to another embodiment, if a node is present in a group of certain level, it is aware of the group leader when the group is in steady state. Therefore, it can inform its group leader when a change is detected, i.e., messages can be propagated. Further, if a node is present at level i, it must join as leaders in lower level groups, 0, 1, . . . , i−1. This means a change message at level i will be propagated to lower levels (e.g., messages can be propagated downwards).

FIG. 10A is a block diagram illustrating an example network layout and its membership groups according to one embodiment. The configuration example 1000 shows a transformation from a physical configuration 1001 into a hierarchical configuration 1002, for example, using a service graph described above. Note that the IP address of each node in FIG. 10A is shown for illustration purposes only. The actual IP addresses may or may not be the same.

Referring to FIG. 10A, according to one embodiment, at level 1003 nodes A, B and C are leaders for groups $0a$, $0b$, and $0c$ respectively with a TTL value of 1. In the next level 1004, node A forms its own group with a TTL value of 2, since node A cannot reach node B within two hops. In this situation, node A will receive packets both from group $0a$ and $1a$ with TTL values 1 and 2 respectively, because it belongs to the both groups. Then at level 1005, nodes A and B form a group called $2a$ with a TTL value of 3 because they can reach each other with 3 hops. Similarly, node B and C form group $2b$ with a TTL value of 3. It is assumed that B is selected as a leader in group $2a$ and in group $2b$, B is also elected as a leader. Then at level 1006, B forms a group by itself with a TTL value of 4. Other configuration may exist.

Availability change should be made aware to the nodes in the entire cluster. A multicast group leader propagates such information promptly by notifying its members and its parent group or groups. Similarly, for detecting the departure of a node due to failure or an operation decision, a heart beat method may be utilized. In general, a node may continuously multicast its availability (e.g., heartbeat messages) in each multicast group it resides. Since multicast heartbeat packets may get lost, a node is considered dead only when no heartbeat packet is received from the node after a pre-defined time period.

When a multicast group leader receives an update from its child group, it needs to further multicast the update information in its parent multicast group. Similarly, when a leader receives an update message from its parent multicast group, it needs to multicast the new information to its child multicast group. In this way, an update of node status can be propagated to the entire cluster quickly.

Topology-Aware Service Management

The network topology information can be utilized in load-balancing schemes during service invocation. It can also be utilized in maintaining an efficient service yellow page directory.

During service invocation, when module X calls module Y, there are a number of replicas available for Y and the system needs to choose a replica of Y based on a variety of policies. In a local policy approach according to one embodiment, a caller may forward requests to one or more servers that reside under the same switch. It is desirable if performance isolation across switches is provided (e.g., all related components inside a switch deemed to as one single aggregated component).

In a local first policy approach according to another embodiment, if a local replica is available, requests may be forwarded to the local replica under the same switch. Otherwise, requests may be forwarded to replicas under other switches. In this way, availability can be improved if the replicas alive can take all the traffic.

In a balance policy approach according to a further embodiment, this policy tries to measure the fitness of each replica through a linear combination of its workload and the network distance from the caller. According to certain embodiments, certain parameters are used to weigh the importance of the workload index and the distance index in the linear combination.

In one embodiment, a predetermined formula may be used to determine the selection of service node based on topology information. For example, it is assumed that there are 'n' replicas of Y: {y1, y2, . . . yn}. The fitness of each replica is calculated as f (y). Then the system selects from minimum of (f(y1), f(y2), . . . f(yn)) as the one satisfying one or more predetermined to forward the request. f(y) is a linear combination of the load of 'y' and the routing distance from 'x' to 'y':

$$f(y)=\text{alpha}*\text{Load}(y)+(1-\text{alpha})*\text{routing distance}(x\text{->}y)$$

where 0<=alpha<=1. The longer distance from 'x' to 'y', the longer latency is and more risk to take in terms of switch faults. The bigger alpha is, the more weight is put on the load. Otherwise, the distance may be weighted more.

In one system according to one embodiment, the above policies may be implemented, individually or in combination, for different cases. For example, a cluster may be partitioned into two systems to serve a gold class and a bronze class of members according to different performance requirements. The system serving the gold class can use the 'local first' scheme while the system with the bronze class uses the 'local only' scheme. In this way, the gold class can still get resource from that allocated to the bronze class but not vice versa.

Service Yellow-Page Maintenance Examples

Service yellow-page maintenance is essential to service clusters. The goal of the yellow-page service is to maintain a directory of all cluster nodes, including both the aliveness and service information. For a service consumer node, the aliveness information is often used to avoid sending requests to a non-functioning node, and the service information is used to make well-informed decision, load balancing for instance. One can broadcast this information to others, but this is not a scalable approach.

In one embodiment, one approach for this content is to dynamically divide the entire cluster into membership groups based on the network topology among nodes using the above techniques. As a result, the aliveness of a node within each group is published to others in an efficient manner. For each membership group, according to one embodiment, a leader is selected to propagate events to or from the other groups to maintain a global view. When there is any update within a group, the group leader of that group will propagate information to others (e.g., other members within the same group or other groups). One of the advantages is that if a switch fails, the leadership structure is not affected much and a member within the same topology group will still receive information from its leader typically within the topology group. Also information propagation within a topology group is relatively fast and does not affect communication bandwidth needs of the other groups within the cluster.

When a group leader receives an update from its child group(s), according to one embodiment, the group leader multicasts the update information to its parent multicast group(s). Similarly, according to an alternative embodiment, when a group leader receives an update message from its parent multicast group(s), the group leader multicasts the new information to its child multicast group(s). In this way, an update of node status can be propagated to the entire cluster in a relatively quick manner.

FIG. 10B is a block diagram illustrating an example of a network topology configuration according to one embodiment. Referring to FIG. 10B, nodes B, E and H are the leaders of groups 0a, 0b, and 0c respectively. Node E is the leader of group 1a. Assume that node C is dead in group 0a and node B detects this failure and removes C from its membership directory. Then node B also multicasts this update to its parent group 1a at operation 2. At operation 3, node E forwards this information to all nodes in group 0b through multicast after it receives this update at group 1a. At operation 4, all nodes at group 0b update its local membership directory. Concurrently, all nodes at group 0c update its membership directory and exclude node C. Other configurations may exist.

According to certain embodiments, unexpected network partitions or switch failure may be handled with hierarchical timeout. When a leader brings in new information on the group or subgroup it manages, other groups need to memorize the group this leader is in charge and update this information if there is a change. If a group leader is considered to be dead, then all nodes managed by this leader are considered dead tentatively by other groups, mainly for detecting a switch failure.

For example as shown in FIG. 10B, according to one embodiment, if node B is dead, it is possible that it is caused by an unexpected network partition or switch failure so that all nodes in group 0a can be non-accessible from groups 0b and 0c. The other multicast groups in the system first assume that all nodes in group 0a are dead and purge them from the membership directory as a possible switch failure, and then let the new leader in group 0a re-announce their availability in the subsequent iteration.

Since it takes time to remove assumed dead nodes from the membership table of a node and then add them back, to minimize the impact of handling the failure of a leader, according to one embodiment, different timeout values may be assigned for multicast groups at different levels. In a particular embodiment, higher level groups may be assigned with larger timeout value, namely a longer heartbeat waiting period in determining if a node is dead or not. In this way, when a group leader fails, a new leader can be quickly selected to replace the failed leader before the higher level group detects the failure of this old lower level group leader. This can avoid the unnecessary purging of nodes from the available membership directory.

According to certain embodiments, delta information updating and recovery of lost messages may be utilized. When a leader updates new information to a multicast group, it only announces the changed portion to minimize a communications size. Because UDP multicast packets can be lost during network transmission, to help detect a packet loss, each host may assign a sequence number for an update message. Thus the receiver can use the sequence number to detect lost updates. Since each update about a node departure or join has a very short message, we let an update message piggyback last three updates so that the receiver can tolerate up to three consecutive packets are losses. If more than three consecutive packets are lost, the receiver may poll the sender to synchronize its membership directory.

Figure 11:
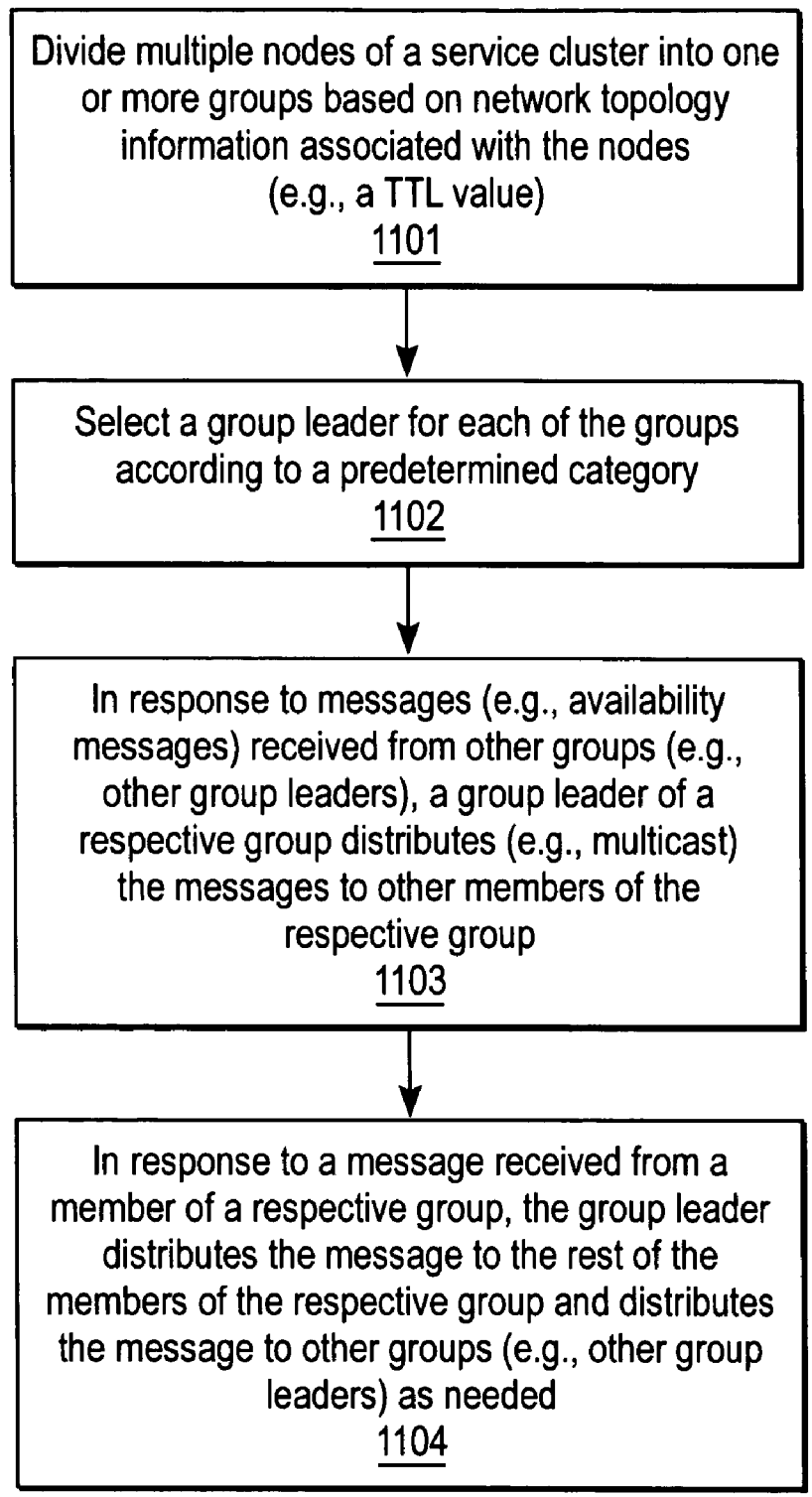
FIG. 11 is a flow diagram illustrating an example of a process performed by a service cluster according to another embodiment of the invention.

FIG. 11 is a flow diagram illustrating an example of a process for service management according to one embodiment. The process 1100 may be performed by processing logic that may comprise hardware (e.g., circuitry, dedicated logic, etc.), software (such as is run on a general-purpose computer system, a server, a router, or a dedicated machine), or a combination of both. For example, process 1100 may be performed by one or more nodes of service clusters shown in FIGS. 10A and 10B.

Referring to FIG. 11, at block 1101, multiple nodes or servers of a service cluster are divided into one or more groups based on network topology information associated with the nodes, such as, for example, a TTL value of an IP packet processed by a node. At block 1102, a node is selected as a leader for each group according to a predetermined category. At block 1103, in response to a message received from other groups (e.g., leaders of other groups), a group leader of a respective group distributes the message to other members of the respective group. At block 1104, in response to a message received from a member of a respective group, the leader of the respective group distributes the message to other groups (e.g., leaders of other groups), as well as the rest of the members of the respective group. Other operations may also be performed.

Cluster-Based Internet Service Examples

According to certain embodiments of the invention, the above techniques may be applied to cluster-based Internet services, such as, for example, membership services. A membership service maintains a directory of all available service nodes, a type of their services, and other application specific status information. This information is made available to all nodes within a cluster or a specific network. A membership service needs to detect a change relatively quickly when a node enters or leaves a cluster, or alternatively there is a network failure. With node membership information, when a node seeks a service from other nodes, it can avoid unavailable nodes that are listed providing such a service and can select the best replica based on its load. The consideration of networking infrastructure is important in designing an efficient membership protocol since the membership information is propagated through such a network.

Figure 12A:
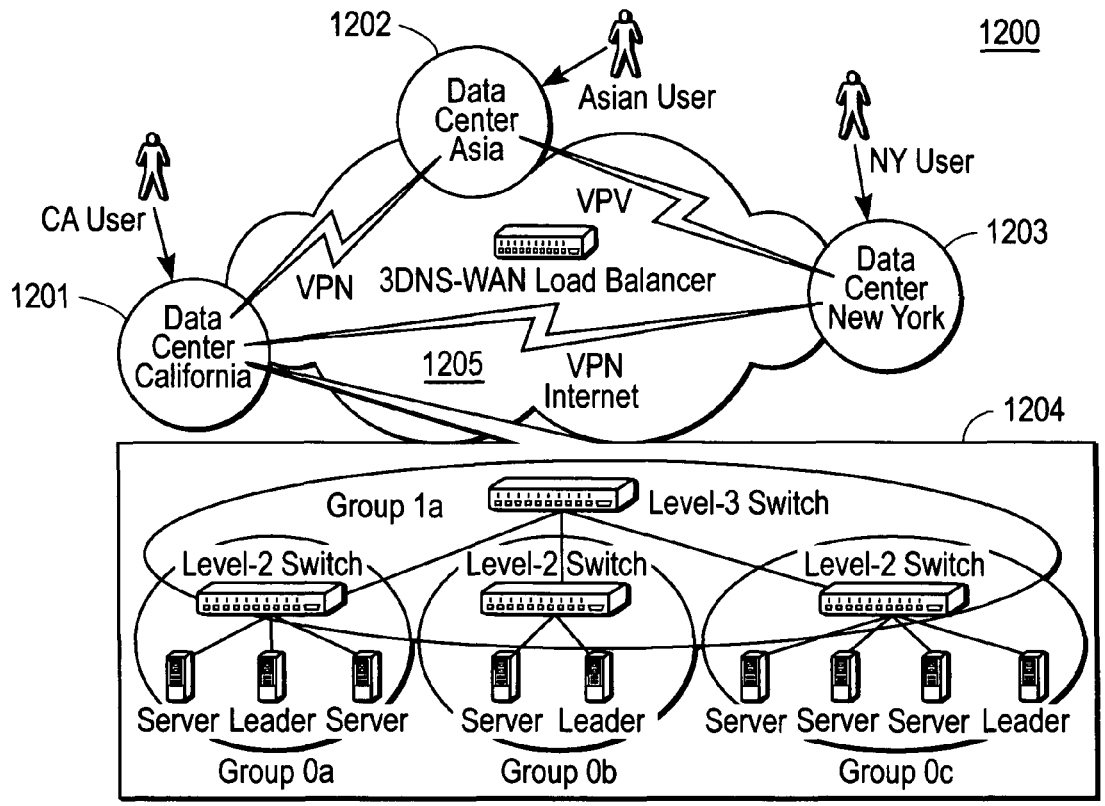
FIGS. 12A and 12B are block diagrams illustrating a network topology configuration using service clusters according to certain embodiments of the invention.

FIG. 12A is a block diagram illustrating a sample layout of an Internet service on clusters located in multiple hosting centers according to one embodiment of the invention. The sample layout 1200 may utilize some or all of the techniques described above. Referring to FIG. 12A, each of the data centers 1201-1203 may include a relatively large cluster of nodes and each node provides certain services to network users. A service may be available from multiple hosting centers or a service may be provided at one center and accessed from another center. Since typically network service applications localize communications and computation within a data center, an efficient membership protocol in a relatively large scale cluster within a data center is needed.

According to one embodiment, referring to FIG. 12A, each of the data centers 1201-1203 coupled over the Internet 1205 may be implemented to include a service cluster similar to cluster 1204. Service cluster 1204 may be designed and implemented using any of the techniques described above. For example, as described above, service cluster 1204 may be designed based on a service graph having a hierarchical structure based on a network topology of the nodes within the cluster. The nodes of service cluster 1204 may be divided into multiple groups and each group may elect a leader for responsible to communicate with another leader of another group and propagate the messages from other groups into its members (e.g., child nodes).

According to another embodiment, the membership protocol may be extended to utilize membership service proxies in each data center to enable exchange of membership information and service invocation across multiple data centers. The proxies in each of the data centers and collect local membership information and exchange the information with proxies of other data centers.

Figure 12B:
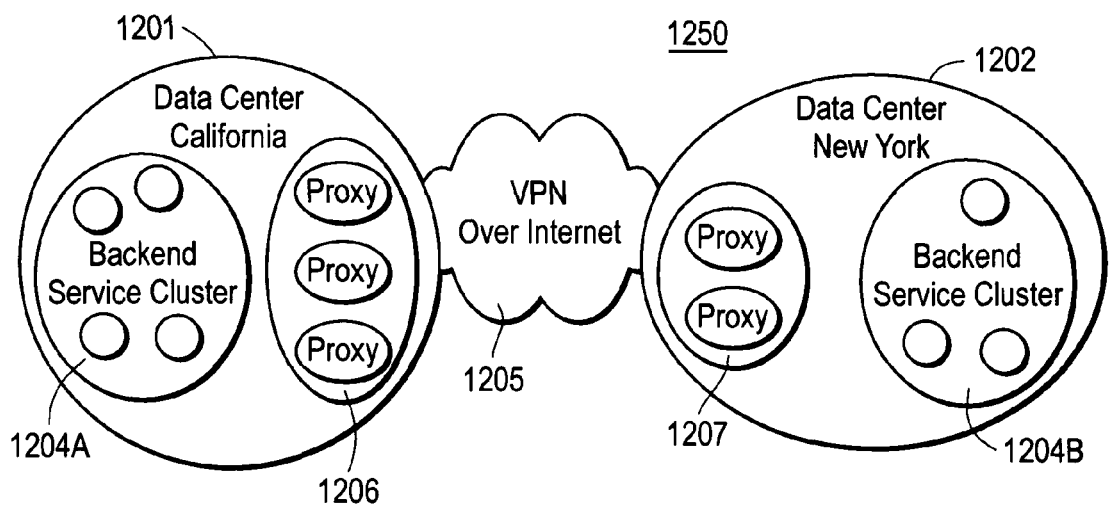

FIG. 12B is a block diagram illustrating a membership proxy protocol among multiple data centers according to one embodiment of the invention. Referring to FIG. 12B, according to one embodiment, multiple membership proxies may be implemented within each of the data centers 1201 and 1202. These proxies form a distinct group (e.g., groups 1206 and 1207) and elect a group leader. Some or all of the proxies may join the membership channel of the service cluster to collect the membership information of the respective data center. In one embodiment, a single external IP address may be shared by the proxies, for example, using IP failover mechanism.

When a proxy leader fails, the newly elected leader may take over the IP address. Thus, other data centers may see the same IP address and communicate with the proxy group leader. According to certain embodiments of the invention, proxy leaders periodically send heartbeat packets to other data centers. These heartbeat packets include a summary of membership information of the local data center. The summary may be broken into multiple heartbeat packets when the size becomes relatively large.

When a proxy leader becomes aware of a status change in its local data center and this change also updates the membership summary, the leader may inform other proxy leaders. After the other proxy leaders receive the notification, they may update their membership directories to reflect the changes and relay the updates to other proxies within the local data centers. Other configurations may exist.

Network Configuration Examples

Figure 13:
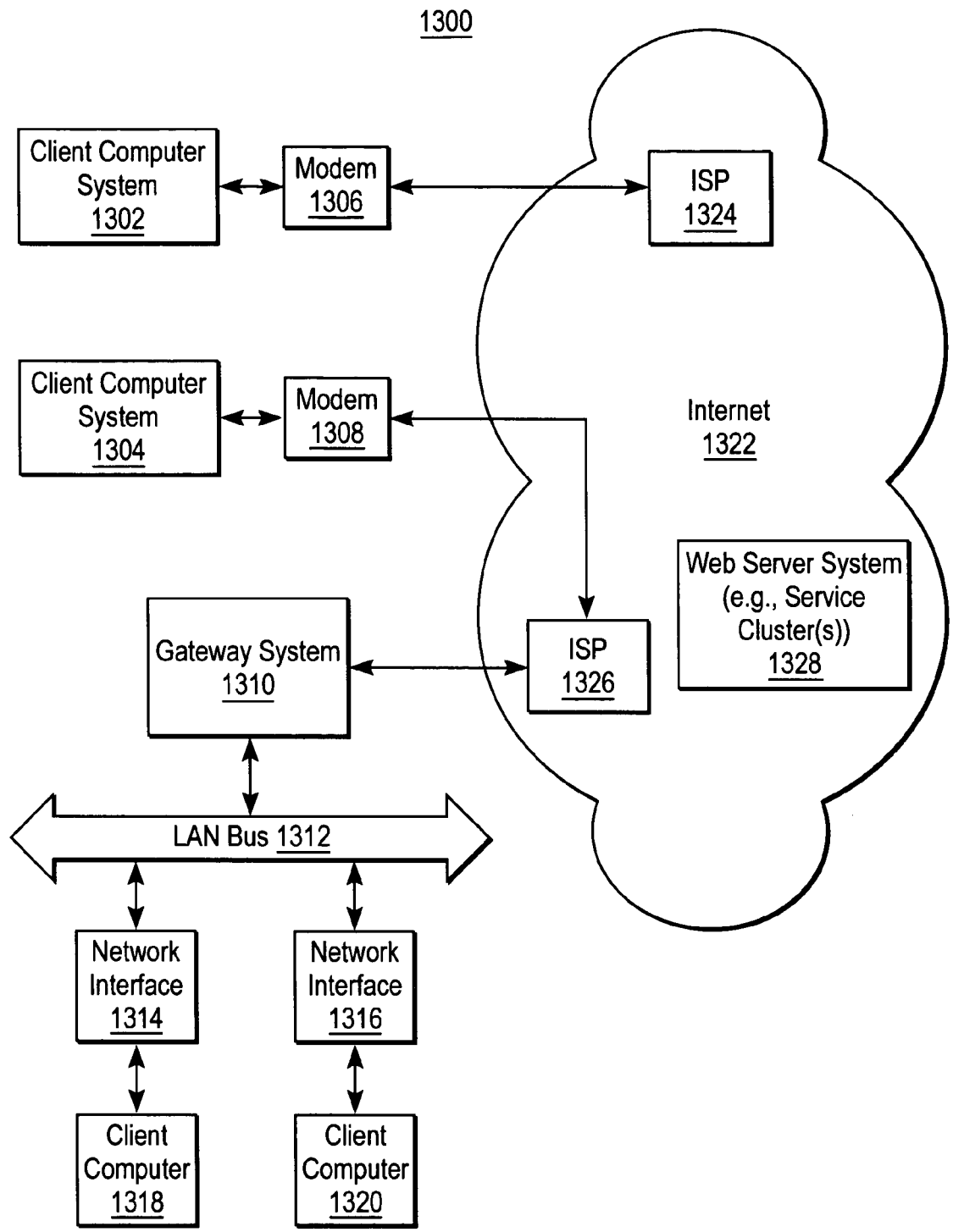
FIG. 13 is a block diagram of a network configuration which may be used with an embodiment of the invention of the invention.

FIG. 13 is a diagram of a network of computer systems in which a service cluster described above may be utilized according to one embodiment. As shown in FIG. 13, a network 1300 includes a number of client computer systems that are coupled together through an Internet 1322. It will be appreciated that the term "Internet" refers to a network of networks. Such networks may use a variety of protocols for exchange of information, such as TCP/IP, ATM, SNA, SDI. The physical connections of the Internet and the protocols and communication procedures of the Internet are well known to those in the art. It will be also appreciated that such systems may be implemented in an Intranet within an organization.

Access to the Internet 1322 is typically provided by Internet service providers (ISPs), such as the ISP 1324, and the ISP 1326. Users on client systems, such as the client computer systems 1302, 1304, 1318, and 1320, generally obtain access to the Internet through Internet service providers, such as ISPs 1324 and 1326. Access to the Internet may facilitate transfer of information (e.g., email, text files, media files, etc.) between two or more digital processing systems, such as the client computer systems 1302, 1304, 1318, and 1320 and/or a Web server system 1328, where the Web server system 1328 may be implemented as a part of a service cluster described above.

For example, one or more of the client computer systems 1302, 1304, 1318, and 1320 and/or the Web server 1328 may provide document presentations (e.g., a Web page) to another one or more of the client computer systems 1302, 1304, 1318, and 1320 and/or Web server 1328. For example, in one embodiment of the invention, one or more client computer systems 1302, 1304, 1318, and 1320 may request to access a document that may be stored at a remote location, such as the Web server 1328. In the case of remote storage, the data may be transferred as a file (e.g., download) and then displayed (e.g., in a window of a browser) after transferring the file. In another embodiment, the document presentation may be stored locally at the client computer systems 1302, 1304, 1318, and/or 1320. In the case of local storage, the client system may retrieve and display the document via an application, such as a word processing application, without requiring a network connection.

The Web server 1328 typically includes at least one computer system to operate with one or more data communication protocols, such as the protocols of the World Wide Web and, as such, is typically coupled to the Internet 1322. Optionally, the Web server 1328 may be part of an ISP which may provide access to the Internet and/or other network(s) for client computer systems. The client computer systems 1302, 1304, 1318, and 1320 may each, with appropriate Web browsing software, access data, such as HTML document (e.g., Web pages), which may be provided by the Web server 1328.

The ISP 1324 provides Internet connectivity to the client computer system 1302 via a modem interface 1306, which may be considered as part of the client computer system 1302. The client computer systems 1302, 1304, 1318, and 1320 may be a conventional data processing system, such as a personal computer, a "network" computer, a handheld/portable computer, a cell phone with data processing capabilities, a Web TV system, or other types of digital processing systems (e.g., a personal digital assistant (PDA)).

Similarly, the ISP 1326 provides Internet connectivity for the client computer systems 1302, 1304, 1318, and 1320. However, as depicted in FIG. 13, such connectivity may vary between various client computer systems, such as the client computer systems 1302, 1304, 1318, and 1320. For example, as shown in FIG. 13, the client computer system 1304 is coupled to the ISP 1326 through a modem interface 1308, while the client computer systems 1318 and 1320 are part of a local area network (LAN). The interfaces 1306 and 1308, shown as modems 1306 and 1308, respectively, may represent an analog modem, an ISDN modem, a DSL modem, a cable modem, a wireless interface, or other interface for coupling a digital processing system, such as a client computer system, to another digital processing system.

The client computer systems 1318 and 1320 are coupled to a LAN bus 1312 through network interfaces 1314 and 1316, respectively. The network interface 1314 and 1316 may be an Ethernet-type, asynchronous transfer mode (ATM), or other type of network interface. The LAN bus is also coupled to a gateway digital processing system 1310, which may provide firewall and other Internet-related services for a LAN. The gateway digital processing system 1310, in turn, is coupled to the ISP 1326 to provide Internet connectivity to the client computer systems 1318 and 1320. The gateway digital processing system 1310 may, for example, include a conventional server computer system. Similarly, the Web server 1328 may, for example, include a conventional server computer system.

Data Processing System Examples

Figure 14:
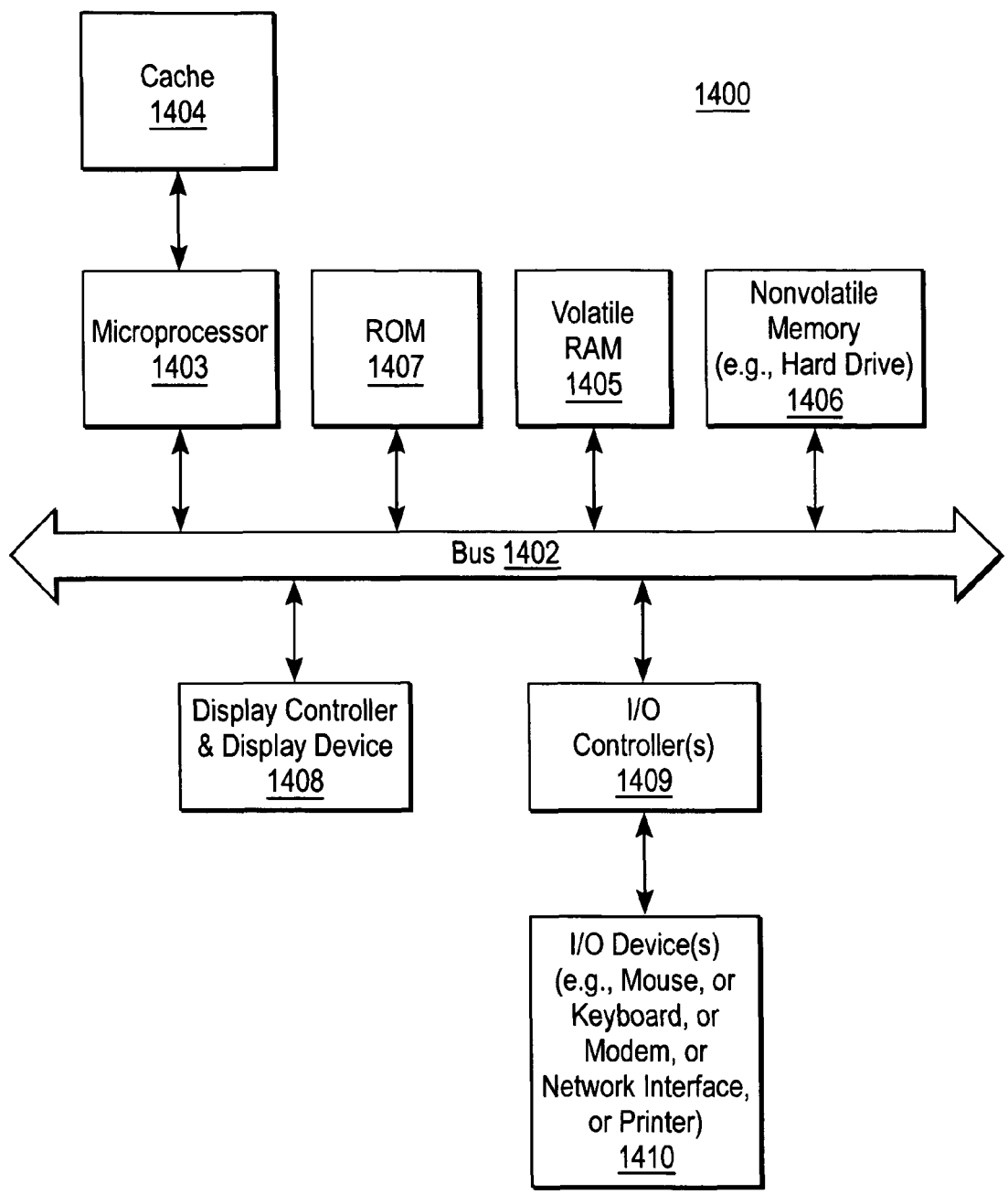
FIG. 14 is a block diagram of a data processing system which may be used with an embodiment of the invention of the invention.

FIG. 14 is a block diagram of a digital processing system which may be used with one embodiment of the invention. For example, the system 1400 shown in FIG. 14 may be used any one of the nodes described above and shown in FIGS. 1-2, 3A-3B, 4A-4C, 8A-8B, 10-11, and 13.

Note, that while FIG. 14 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 14 may, for example, be an Apple Macintosh computer or an IBM compatible PC.

As shown in FIG. 14, the computer system 1400, which is a form of a data processing system, includes a bus 1402 which is coupled to a microprocessor 1403 and a ROM 1407, a volatile RAM 1405, and a non-volatile memory 1406. The microprocessor 1403, which may be, for example, a PowerPC microprocessor from Motorola, Inc. or IBM, or a Pentium processor from Intel, is coupled to cache memory 1404 as shown in the example of FIG. 14. The bus 1402 interconnects these various components together and also interconnects these components 1403, 1407, 1405, and 1406 to a display controller and display device 1408, as well as to input/output (I/O) devices 1410, which may be mice, keyboards, modems, network interfaces, printers, and other devices which are well-known in the art. Typically, the input/output devices 1410 are coupled to the system through input/output controllers 1409. The volatile RAM 1405 is typically implemented as dynamic RAM (DRAM) which requires power continuously in order to refresh or maintain the data in the memory. The non-volatile memory 1406 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 14 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1402 may include one or more buses connected to each other through various bridges, controllers, and/or adapters, as is well-known in the art. In one embodiment, the I/O controller 1409 includes a USB (Universal Serial Bus) adapter for controlling USB peripherals. Alternatively, I/O controller 1409 may include an IEEE-1394 adapter, also known as FireWire adapter, for controlling FireWire devices.

Thus, topology-centric resource management for large scale service clusters has been described. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, the present invention is not described with reference to any particular programming language. It will be appreciated that a variety of programming languages may be used to implement the teachings of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method, comprising:
    dividing a plurality of nodes of a service cluster into a plurality of groups each having a plurality of members, each group having a group leader node to communicate with other groups of the service cluster;
    allowing a node to join a group;
    (i) determining whether the node joining the group is a leader of the group; and
    (ii) if the node joining the group is the leader of the group, increasing a time-to-live (TTL) value of the node joining the group, whereupon the node joins another group at a next higher level of a hierarchy of groups, each group comprising nodes having a same TTL value;
    wherein steps (i) and (ii) are repeated until the node is not elected as a leader of a current group or the TTL value of the node reaches a maximum value; and
    in response to a message received from a member of a respective group, the group leader node of the respective group distributing the message to the other groups of the service cluster and a remainder of the members of the respective group.

2. The method of claim 1, further comprising selecting the group leader node which is the leader of each group as a group leader using an algorithm.

3. The method of claim 2, wherein the group leader of each group is responsible for communicating among the plurality of groups without having the remainder of the members of the each group to directly communicate with the other groups.

4. The method of claim 1, wherein the message includes one of a joining and terminating the respective group message.

5. The method of claim 1, further comprising in response to another message received from a second group of the service cluster, the group leader node of the respective group forwarding the another message to the members of the respective group.

6. The method of claim 5, wherein the another message from the second group includes an availability status of at least one member of the second group.

7. The method of claim 1, further comprising:
    in response to a packet received from a client over a wide area network (WAN), identifying a group for servicing the client based on a group identifier (ID) specified within the packet; and
    distributing the packet to the identified group with the group ID.

8. The method of claim 7, wherein the packet is an IP packet and wherein the group ID is derived from a standard field of the IP packet.

9. The method of claim 8, wherein the group ID is determined based on a value within a TTL (time-to-live) field of an IP header of the packet.

10. A service cluster, comprising:
    a plurality of nodes each having a time-to-live (TTL) value, coupled to each other and divided into a plurality of groups, each respective group having a group leader node as a leader of the each group to communicate with a remainder of the groups,
    wherein a node of a plurality of nodes is configured to, upon joining a group, (i) determine whether the node is a leader of the group; and
    (ii) if the node is the leader of the group, increases the TTL value of the node whereupon the node joins another group at a next higher level of a hierarchy of groups, each group comprising nodes having a same TTL value, and wherein the node is further configured to repeat (i) and (ii) until the node is not elected as a leader of a current group or the TTL value of the node reaches a maximum value; and
    wherein in response to a message received from a member of a respective group, the group leader node of the respective group distributes the message to at least one of a remainder of the groups and a remainder of members within the respective group.

11. The service cluster of claim 10, wherein the group leader node of each group is responsible for communicating among the groups without having the remainder of the members of the each group to directly communicate with the remainder of the groups.

12. The service cluster of claim 10, wherein in response to another message received from a second group of the service cluster, the group leader node of the respective group forwards the another message to the members of the respective group.

13. The service cluster of claim 12, wherein the another message from the second group includes an availability status of at least one member of the second group.

14. The service cluster of claim 10, further comprising a frontend node coupled to the plurality of nodes, wherein in response to a packet received from a client over a wide area network (WAN), the frontend node identifies a group for servicing the client based on a group identifier (ID) specified within the packet and distributes the packet to the identified group with the group ID.

15. The service cluster of claim 14, wherein the packet is an IP packet and wherein the group ID is derived from a standard field of the IP packet.

16. The service cluster of claim 15, wherein the group ID is determined based on a value within a TTL (time-to-live) field of an IP header of the packet.

* * * * *